United States Patent Office 3,454,628
Patented July 8, 1969

3,454,628
EXTRACTION OF CRYSTALLIZED DIAMMONIUM ACETONE DISULFONATE
Günter Schröder, Ober-Ramstadt-Eiche, Herbert Fink, Bickenbach uber Darmstadt, and Helmut Goth, Darmstadt, Germany, assignors to Rohm & Haas G.m.b.H., Darmstadt, Germany
No Drawing. Filed May 8, 1968, Ser. No. 727,661
Claims priority, application Germany, May 13, 1967, R 64,013
Int. Cl. C07c 143/06, 139/14
U.S. Cl. 260—513                      4 Claims

ABSTRACT OF THE DISCLOSURE

Diammonium acetone disulfonate is recovered from sulfonation reaction mixtures by heating with methanol until the salt crystallizes, and then physically separating the crystallized salt.

---

This invention relates to a method of recovering crystallized diammonium acetone disulfonate from a sulfonation mixture containing said salt.

Salts of acetone disulfonic acid are known. F. Raschig reported isolation of the potassium salt from the reaction product of dichloroacetone with potassium sulfite [Chem. Ber. 59 (1926), page 2025]. Terentjew reported sulfonation of acetone with sulfur trioxide in a solvent mixture of dichloroethane and dioxan, and extracted therefrom the barium salt of acetone disulfonic acid [Chemical Abstracts, 48 (1954), column 6958].

The diammonium salt of acetone disulfonic acid is produced in considerable quantities as a byproduct in the preparation, described, e.g., in German Patent 648,237, of methylmethacrylate from acetone cyanohydrin and sulfuric acid. However, no economical means has heretofore been suggested for recovering this salt from the reaction mixture.

It has now been found that the diammonium acetone disulfonate can be recovered economically and in good yield from such sulfonation reaction mixtures which are substantially anhydrous by adding methanol to the mixture, heating it until the diammonium salt crystallizes, and then extracting it.

The term "sulfonation reaction mixture," as used herein, includes reaction mixture of acetone cyanohydrin with sulfuric acid, i.e., mixtures partly neutralized with ammonia, those obtained by direct reaction of sulfuric acid or mixtures thereof with sulfur trioxide and/or a nitrogen-containing compound such as ammonia, an aminosulfonic acid, ammonium sulfate or ammonium pyrosulfate or acetone. In place of acetone, it is also possible to use acetone derivatives, such as acetone cyanohydrin, hydroxy-isobutyric acid or amides thereof, or acetone ketals. The sulfonation reaction mixtures useful as starting materials in the method of this invention are those which are substantially anhydrous, i.e., contain little or no water, and contain, in addition to the desired diammonium salt of acetone disulfonic acid, ammonium ions, sulfate and bisulfate ions, pyrosulfate ions and/or sulfur trioxide.

In order to make the recovery process of this invention economical, the diammonium salt content of the starting sulfonation reaction mixture should be at least about 0.5 percent by weight. The process is, however, operable with smaller initial concentrations, reduced yields being obtainable. Reaction mixtures of acetone cyanohydrin and excess sulfuric acid, mostly 100%, obtained in the preparation of methylmethacrylate contain about 1 to 3% by weight diammonium acetone disulfonate, the salt content increasing with increasing $SO_3$ content of the sulfuric acid employed.

In accordance with a preferred embodiment of the invention, the reaction mixture is allowed to boil under reflux for 20 to 30 minutes after addition of methanol. The physical separation of the crystallized salt can be effected in known manner, e.g., by filtration, centrifugation or decanting. The salt, which is initially soluble in the sulfonation reaction mixture, crystallizes as the dissolving sulfuric acid and ammonium bisulfate are esterified to monomethyl sulfuric acid and ammonium monomethyl sulfate. The latter, which is fairly soluble in warm methanol, crystallizes out of cold methanol. For this reason the diammonium acetone disulfonate is separated either while warm or, after considerable further dilution of the reaction mixture with methanol, at room temperature.

The yield of diammonium salt increases with increasing conversion of the inorganic sulfur compounds, such as sulfuric acid, ammonium bisulfate and the like, into the corresponding organic sulfonic acid esters. It is advangeous, therefore, to use at least one mol of methanol per mol of inorganic sulfur compound.

If the method of the invention is applied to a reaction mixture of acetone cyanhydrin and sulfuric acid, the main product of which is methacrylamide sulfate, methylmethacrylate is formed simultaneously upon heating the reaction mixture with methanol. Consequently, this embodiment of the method of the invention can be incorporated into a process for producing methyl methacrylate.

The diammonium salt can be recrystallized from methanol if it is not obtained in sufficiently pure form after separation from the sulfonation reaction mixture. The salt is useful as a flameproofing additive to paper, cotton and bast fibrous materials and other cellulosic products. It also has utility as a hardening catalyst for phenol and aminoplast resins.

Example 1

85 g. (1 mol) acetone cyanhydrin are added dropwise at 80° C. to 1.5 mols of 100% sulfuric acid to which 2.5 g. anhydrous copper sulfate had previously been added. The mixture was then heated for 30 minutes to 130° C.

The resulting sulfonation reaction mixture is then boiled under reflux after addition thereto of two mols of methanol. The crystals precipitated thereby are filtered with suction and washed with a mixture of water and methanol. The yield of acetone disulfonic acid diammonium salt is 6.0 g.

Example 2

The procedure of Example 1 is repeated, 1.1 mols of 95% sulfuric acid, however, being employed in the preparation of the sulfonation reaction mixture. The yield of the diammonium salt is 2.5 g.

Example 3

The procedure of Example 1 is repeated, 1.1 mols of 104% sulfuric acid, however, being employed in the preparation of the sulfonation reaction mixture. The yield of the diammonium salt is 15 g.

In Examples 1 to 3, practically the entire amount of diammonium acetone disulfonate formed as a byproduct in the esterification mixture is separated and extracted.

Example 4

A mixture of 72 g. of 65% oleum and 13 g. ammonium sulfate is warmed to 85 to 90° C. for one hour, whereupon 5.8 g. (0.1 mol) acetone are added and heating is continued for an additional hour.

After addition of five mols methanol and a half hour boiling under reflux, diammonium acetone disulfonate crystallizes and separates. It is filtered off, washed and dried. The yield is 20.4 g., or 81% theoretical.

Example 5

2.5 mols 100% sulfuric acid and 0.5 mol aminosulfonic acid are mixed and heated to 130 to 135° C. for 30 minutes. Then 5.8 g. acetone are added dropwise in the course of ten minutes and the reaction mixture is heated to 130° C. for ten minutes.

The resulting sulfonation reaction mixture is reacted with 224 g. methanol and stirred for one hour at 100° C. After cooling to 20° C., precipitated diammonium acetone disulfonate is separated by filtration. The yield is 11 g., corresponding to a 43% theoretical yield.

Example 6

246 g. of 65% oleum are introduced into a cooled mixture of 410 g. 100% sulfuric acid and 132 g. ammonium sulfate. Then, in the course of 35 minutes and at a temperature of 85 to 95° C., 58 g. (1 mol) acetone are added dropwise. A temperature of 90 to 95° C. is maintained for an additional hour after all the acetone is added. 640 g. (20 mols) methanol are then added and the reaction mixture is maintained at 80° C. for one hour.

A crystalline paste is obtained which is separated by filtration under suction after cooling to room temperature. The crystals are lightly washed with methanol. The yield of diammonium acetone disulfonate obtained in this manner is 193 g. (77% theoretical). The nitrogen content of the salt obtained in this manner corresponds to the theoretical value of 11.1%.

We claim:
1. Process for recovering crystallized diammonium acetone disulfonate from a substantially anhydrous sulfonation reaction mixture which comprises adding methanol to said mixture and heating the resulting mixture until said salt crystallizes.
2. Process as defined in claim 1 wherein the molar ratio of added methanol to inorganic sulfur compound in the sulfonation reaction mixture is at least 1:1.
3. Process as defined in claim 1 wherein the initial sulfonation reaction mixture is derived from a reaction of acetone cyanhydrin with sulfuric acid.
4. Process as defined in claim 1 wherein the initial sulfonation reaction mixture is derived from a sulfonation of acetone in the presence of ammonia, aminosulfonic acid, an ammonium sulfate or an ammonium pyrosulfate.

References Cited

Tarentev et al.: Chemical Abstracts 48, 6958 (1954).

DANIEL D. HORWITZ, *Primary Examiner.*

U.S. Cl. X.R.

117—136; 252—8.1